United States Patent
Takayanagi et al.

(10) Patent No.: US 8,072,555 B2
(45) Date of Patent: Dec. 6, 2011

(54) DISPLAY DEVICE, DISPLAY PANEL UNIT, AND INFORMATION PROCESSING APPARATUS

(75) Inventors: Masaya Takayanagi, Kawasaki (JP); Masuo Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1021 days.

(21) Appl. No.: 12/000,920

(22) Filed: Dec. 18, 2007

(65) Prior Publication Data

US 2008/0143921 A1    Jun. 19, 2008

(30) Foreign Application Priority Data

Dec. 19, 2006   (JP) .................. 2006-341375

(51) Int. Cl.
*G02F 1/1333* (2006.01)
(52) U.S. Cl. ............................ 349/58
(58) Field of Classification Search .............. None
See application file for complete search history.

(56) References Cited

U.S. PATENT DOCUMENTS

| | | | |
|---|---|---|---|
| 6,966,674 B2 | 11/2005 | Tsai | |
| 7,563,014 B2 * | 7/2009 | Ogawa | 362/628 |
| 2001/0013924 A1 | 8/2001 | Yokoyama et al. | |
| 2002/0001192 A1 | 1/2002 | Suehiro et al. | |
| 2004/0004424 A1 | 1/2004 | Sakurai | |
| 2006/0132699 A1 | 6/2006 | Cho et al. | |
| 2006/0133090 A1 | 6/2006 | Noh et al. | |
| 2006/0274394 A1 | 12/2006 | Falk | |
| 2006/0275965 A1 | 12/2006 | Jeong | |
| 2007/0076431 A1 | 4/2007 | Atarashi et al. | |

FOREIGN PATENT DOCUMENTS

| | | |
|---|---|---|
| CN | 1560672 A | 1/2005 |
| CN | 1870080 A | 11/2006 |
| EP | 1 371 899 | 12/2003 |
| JP | 11-84381 | 3/1999 |
| JP | 2001-75094 | 3/2001 |
| JP | 2004-333670 | 11/2004 |
| JP | 2005-37814 | 2/2005 |
| JP | 2005-135862 | 5/2005 |
| JP | 2006-267936 | 10/2006 |
| JP | 2006-268066 | 10/2006 |
| JP | 2006-293182 | 10/2006 |
| KR | 10-2001-0046076 A | 6/2001 |
| KR | 10-2002-0041479 | 6/2002 |
| KR | 10-2005-0067670 | 7/2005 |

(Continued)

OTHER PUBLICATIONS

Korean Office Action issued on Jan. 14, 2009 in corresponding Korean Patent Application 10-2007-0126777.

(Continued)

*Primary Examiner* — Timothy L Rude
(74) *Attorney, Agent, or Firm* — Staas & Halsey LLP

(57) ABSTRACT

A display device includes: a display panel unit that includes a display screen for displaying information and a light emitting section having a light source for emitting light to illuminate the display screen from back, and that linearly generates heat during light emission; and a radiator that receives the heat generated by the light emitting section and dissipates the received heat. The display device further includes a heat transmission section that transmits the heat generated by the light emitting section to the radiator such that heat generated in the middle of a linear heat generation part of the light emitting section is transmitted faster than heat generated at the end of the linear heat generation part.

16 Claims, 16 Drawing Sheets

FOREIGN PATENT DOCUMENTS

| | | |
|---|---|---|
| KR | 10-2005-0072622 | 7/2005 |
| KR | 10-2005-0105823 | 11/2005 |
| KR | 10-2006-0007517 | 1/2006 |
| KR | 10-2006-0058303 | 5/2006 |
| KR | 10-2006-0088940 | 8/2006 |
| KR | 10-2006-0109079 | 10/2006 |

OTHER PUBLICATIONS

Chinese Office Action issued on Feb. 27, 2009 in corresponding Chinese Patent Application 200710194212.8.

Korean Office action issued in corresponding Korean Patent Application No. 10-2009-0083536, mailed on Jul. 15, 2010.

European Office Action issued on Oct. 19, 2009 in corresponding European Patent Application 07 123 417.3.

Extended European Search report issued in corresponding European Patent Application No. 07123417.3, on Apr. 18, 2008.

Korean Office Action issued on Jul. 7, 2009 in corresponding Korean Patent Application 10-2007-0126777.

Japanese Office Action for related Japanese Patent Application No. 2006-341375, mailed on Aug. 2, 2011.

* cited by examiner

DISPLAY DEVICE, DISPLAY PANEL UNIT, AND INFORMATION PROCESSING APPARATUS

BACKGROUND OF THE INVENTION

1. Field of the Invention

The present invention relates to a display device which displays information, a display panel unit, and an information processing apparatus which processes information and displays the processed information.

2. Description of the Related Art

In the fields of device such as personal computer, there have hitherto been widely used liquid crystal panels being a slim display screen which displays information. Particularly, in laptop personal computers, mobile telephones and the like for which device thickness reduction is especially required, backlight-type display devices in which light is irradiated from the rear face side to the liquid crystal panel have been widely used.

In the backlight-type display device, a light source extending in a linear shape is arranged at the side of a liquid crystal panel, and a light guide plate is attached to the rear face of the liquid crystal panel. Light emitted by the light source is guided to the liquid crystal panel by the light guide plate and further diffused by the light guide plate, so that the light is irradiated from the back of the liquid crystal panel. In such a backlight-type display device, the light source and the drive board which drives the light source are disposed at a flank of the liquid crystal panel which has a relatively large spatial margin, so that the thickness of the display device can be reduced.

Conventionally, in the backlight-type display device, CFL tube (cold cathode fluorescent tube) has been used as the light source. However, the CFL tube uses mercury to emit light. Thus, from a viewpoint of environmental protection, LED (light emitting diode) light source which does not use mercury has been increasingly used instead of the CFL tube. The LED light source has the advantages that it is more desirable in terms of environmental protection and less expensive than the CFL tube. However, the LED light source has problems that heat generation is large with respect to the amount of luminescence, and its life and luminance efficiency are significantly reduced by heat.

In this regard, in the backlight-type display device, the following measures have been taken: a radiator fin which dissipates the heat generated by the LED light source is provided (for example, refer to Japanese Patent Laid-Open No. 2006-267936); a radiator plate for dissipating heat is attached to the LED light source (for example, refer to Japanese Patent Laid-Open Nos. 2006-268066 and 2005-135862); a heat transmission plate which receives the heat generated by the LED light source and transmits the heat to the housing and radiator plate is provided (for example, Japanese Patent Laid-Open No. 2006-293182). When these techniques are applied, the temperature rise within the display device caused by the heat generated by the LED light source can be suppressed to reduce the degradation of LED light source.

In the backlight-type display device using an LED light source, typically, plural LEDs are arranged linearly along the side surface of the liquid crystal panel. However, heat flows in a different manner in each LED depending on the location of placement, thereby making ambient temperatures of the plural LEDs non-uniform. Accordingly, even when the techniques of the above described patent documents are applied to dissipate the heat generated by the plural LEDs, the degree of degradation is not uniform in the plural LEDs and thus the luminosity of display screen in the liquid crystal panel is very unlikely to be uniform.

This problem occurs not only in the display device using a liquid crystal panel but also in the backlight-type display device in general.

SUMMARY OF THE INVENTION

The present invention has been made in view of the above circumstances and provides a display device, display panel unit and information processing apparatus which can suppress non-uniformity of light source temperature and thus maintain uniform displaying over a long period of time.

A display device according to the present invention includes:

a display panel unit that includes a display screen for displaying information and a light emitting section having a light source for emitting light to illuminate the display screen from back, and that linearly generates heat during light emission;

a radiator that receives the heat generated by the light emitting section and dissipates the received heat; and a heat transmission section that transmits the heat generated by the light emitting section to the radiator such that heat generated in the middle of a linear heat generation part of the light emitting section is transmitted faster than heat generated at the end of the linear heat generation part.

In a backlight-type display device in which the display screen on which information is displayed is illuminated from the back, light is typically emitted linearly from the side of the display screen; and in the middle of the heat generation part which linearly generates heat during light emission, heat tends to accumulate and thus the temperature tends to rise higher. According to the display device of the present invention, since heat generated in the middle of the linear heat generation part of the light emitting section is transmitted in a more excellent manner than that heat generated the end of the linear heat generation part is transmitted, the heat in the middle of the linear heat generation part where heat tends to accumulate is dissipated more efficiently. Consequently, the non-uniformity of temperature in the linear heat generation part of the light emitting section can be suppressed, so that uniform displaying can be maintained over a long period of time.

Also, in the display device according to the present invention, it is preferable that the radiator is a housing of the display device.

Since the radiator is a housing of the display device, a radiator sheet or the like for dissipating the heat generated by the light emitting section does not need to be additionally provided, so size growth and cost increase of the display device can be suppressed.

Also, in the display device according to the present invention, it is preferable that the light source is a light-emitting diode.

Light-emitting diodes (LED) generate a large amount of heat with respect to the amount of luminescence and tend to be degraded by heat. Thus, when LEDs are used in the display device of the present invention, a large effect can be achieved.

Also, in the display device according to the present invention, it is preferable that the radiator has a first area made of a first material, and a second area made of a second material that transmits heat faster than the first material, and a borderline between the first and second areas forms a protrusion in the first area side, and the heat transmission section is a member which extends along the linear heat generation part of the light emitting section while contacting the light emitting section, the member has a part corresponding to the protrusion of the radiator, the part includes a central portion and an end portion, and the central portion has a larger contact area contacting the second area of the radiator than the end portion.

According to the preferred display device of the present invention, a simple configuration is employed in which the radiator is formed by using the first material and the second material being different from each other in thermal conductivity, and the heat transmission section is made to contact the radiator. Consequently, heat generated in the middle of the linear heat generation part of the light emitting section can be dissipated in a more excellent manner, allowing prevention of an increase in device complexity and the number of components, and thus allowing improvement of device life.

Also, in the display device according to the present invention, it is preferable that the heat transmission section becomes gradually narrower as the heat transmission section extends along the linear heat generation part of the light emitting section toward the end of the heat transmission section while contacting both the light emitting section and the radiator plate.

When the width of the heat transmission section which transmits heat from the light emitting section to the radiator is made wider in the middle of the linear heat generation part of the light emitting section than in the end thereof, the variation in temperature of the heat generation part can be also suppressed.

A display panel unit according to the present invention includes:

a panel body that includes a display screen for displaying information and a light emitting section having a light source for emitting light to illuminate the display screen from back, and that linearly generates heat during light emission; and a radiator plate which receives the heat generated by the light emitting section and dissipates the received heat, and extends along a linear heat generation part of the light emitting section, in which the middle of the radiator plate has a wider heat dissipation area than the end of the radiator plate.

According to the display panel unit of the present invention, in the radiator plate which extends along the linear heat generation part of the light emitting section, the middle of the heat generation part where heat tends to accumulate is formed wider in heat dissipation area than the end thereof. Accordingly, non-uniformity of temperature in the heat generation part can be suppressed and thus uniform displaying can be maintained over a long period of time.

Also, in the display panel unit according to the present invention, it is preferable that the radiator plate becomes gradually narrower from the middle to the end thereof.

According to the preferred display panel unit of the present invention, in the linear heat generation part of the light emitting section, heat dissipation is larger in the middle thereof where heat tends to accumulate than in the end thereof, so that the temperature of the heat generation part can be accurately made uniform.

Also, in the display panel unit according to the present invention, it is preferable that the light source is a light-emitting diode.

Light-emitting diodes are easily degraded by heat. Thus, when light-emitting diodes are used in the display panel unit of the present invention, a large effect can be achieved.

A first information processing apparatus according to the present invention includes:

a display section having:

a display panel unit that includes a display screen for displaying information and a light emitting section having a light source for emitting light to illuminate the display screen from back, and that linearly generates heat during light emission, a radiator that receives the heat generated by the light emitting section and dissipates the received heat, and a heat transmission section that transmits the heat generated by the light emitting section to the radiator such that heat generated in the middle of the linear heat generation part of the light emitting section is transmitted faster than heat generated at the end of the linear heat generation part; and a processing section that processes information and causes the display section to display the processed information on the display section of the display panel unit included in the display section.

A second information processing apparatus according to the present invention includes:

a display section having a display panel unit including:

a panel body that includes a display screen for displaying information and a light emitting section having a light source for emitting light to illuminate the display screen from back, and that linearly generates heat during light emission, and a radiator plate which receives the heat generated by the light emitting section and dissipates the received heat, and which extends along a linear heat generation part of the light emitting section, in which the middle of the radiator plate has a wider heat dissipation area than the end of the radiator plate; and a processing section that processes information and causes the display section to display the processed information on the display section of the display panel unit included in the display section.

According to the first information processing apparatus or the second information processing apparatus of the present invention, non-uniformity of temperature in the linear heat generation part of the light emitting section can be suppressed, so light can be uniformly irradiated on the display screen over a long period of time.

According to the present invention, partial non-uniformity of temperature in the light source can be suppressed and thus light can be uniformly irradiated on the backlight-type display screen over a long period of time.

DETAILED DESCRIPTION OF THE INVENTION

Embodiments of the present invention will be described with reference to the drawings.

Figure 1:
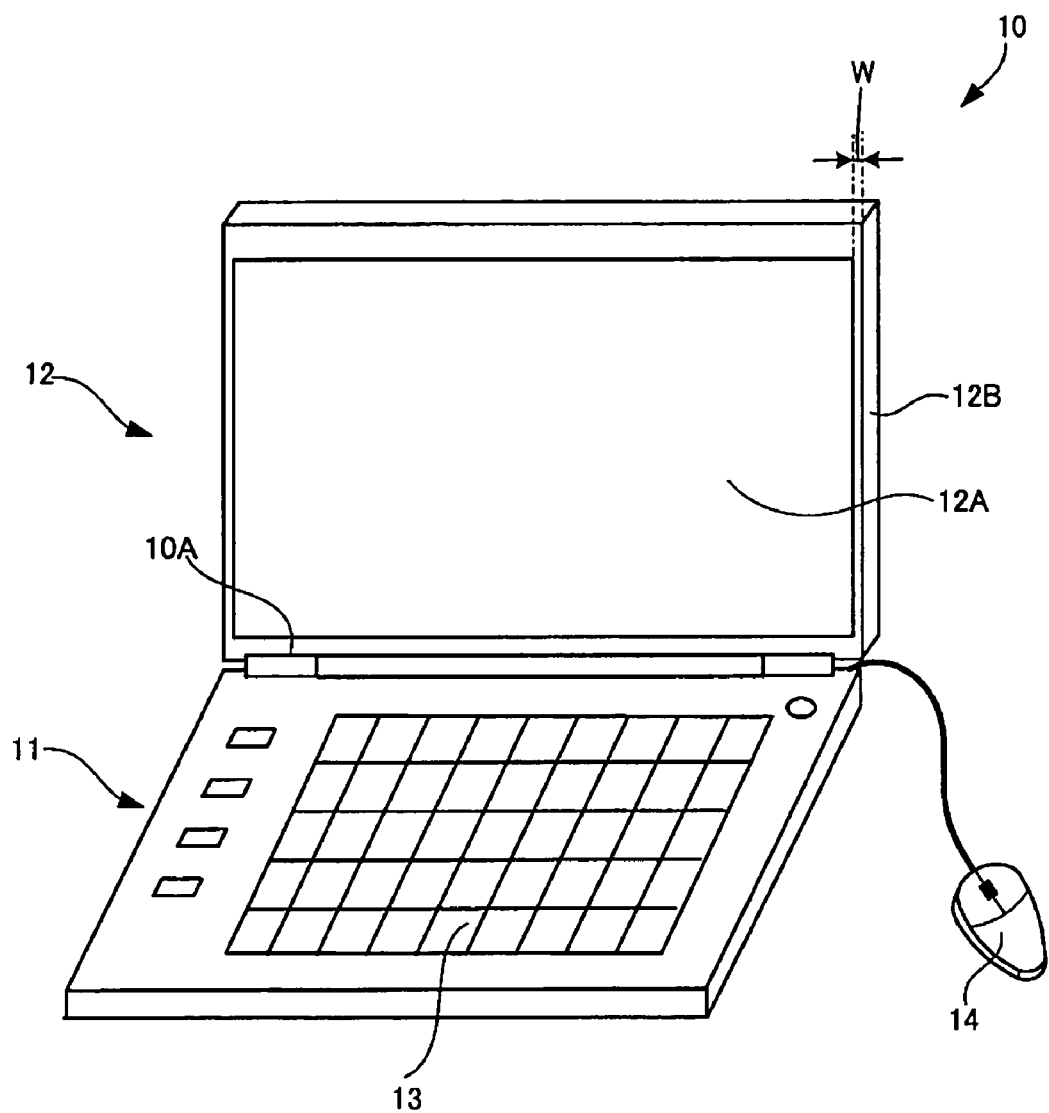
FIG. 1 is an external perspective view of a personal computer to which an embodiment of the present invention is applied.

FIG. 1 is an external perspective view of a personal computer 10 to which an embodiment of the present invention is applied.

Referring to FIG. 1, the personal computer 10 includes a main device 11, a display device 12 which displays various types of information on a display screen 12A according to a command from the main device 11, a keyboard 13 for inputting various types of information dependent on a key operation into the main device 11, and a mouse 14 by which a position on the display screen is specified, so that a command dependent on an icon or the like displayed on that position is inputted. Further, though not illustrated in FIG. 1, the personal computer 10 includes an FD mounting opening for mounting a flexible disk (hereinafter referred to as an FD) and a CD-ROM mounting opening for mounting a CD-ROM. The display screen 12A corresponds to an example of the display screen according to the present invention.

In the personal computer 10, the display device 12 is joined to the main device 11 via a hinge 10A. In the display device 12, the width W of a housing 12B at a margin beside the display screen 12A is small, thus achieving device downsizing. The display device 12 corresponds to an example of the display section according to the present invention, and also corresponds to one embodiment of the display device according to the present invention; and the main device 11 corresponds to an example of the processing section according to the present invention.

The configuration in the inside of the housing 12B of the display device 12 will be described in detail later.

Figure 2:
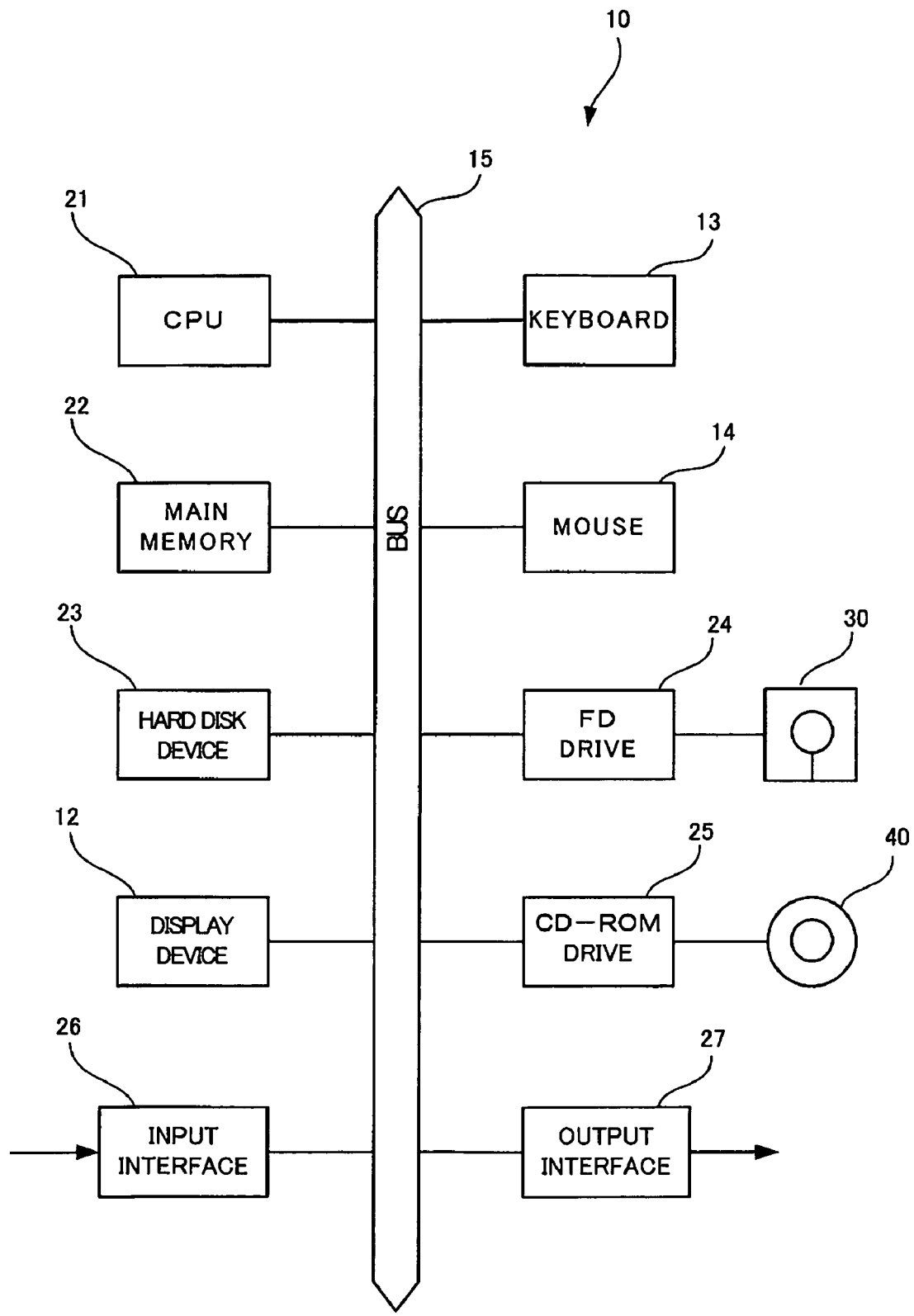
FIG. 2 is a hardware configuration diagram of the personal computer.

FIG. 2 is a hardware configuration diagram of the personal computer 10.

As illustrated in FIG. 2, incorporated in the inside of the main device 11 are: a CPU 21 which controls the whole personal computer 10; a main memory 22 into which a program stored in a hard disk device 23 is read to be executed by the CPU 21; the hard disk device 23 in which various types of programs, data and the like are stored; an FD drive 24 which an FD 30 mounted therein; a CD-ROM drive 25 which accesses a CD-ROM 40; an input interface 26 which is connected to various devices and receives various data; and an output interface 27 which is connected to a printer or the like and sends various data. These components, the display device 12, the keyboard 13 and the mouse 14 illustrated as well in FIG. 1 are connected to each other via a bus 15.

The personal computer 10 basically has the above-described configuration.

The internal configuration of the display device 12 will now be described in detail. In the following description, the "front" means the front side of the display device 12 illustrated in FIG. 1 where the display screen 12A for displaying information is disposed, and the "rear" means the rear side of the display device 12 (the other side with respect to the front side where the display screen 12A is disposed).

Figure 3A:
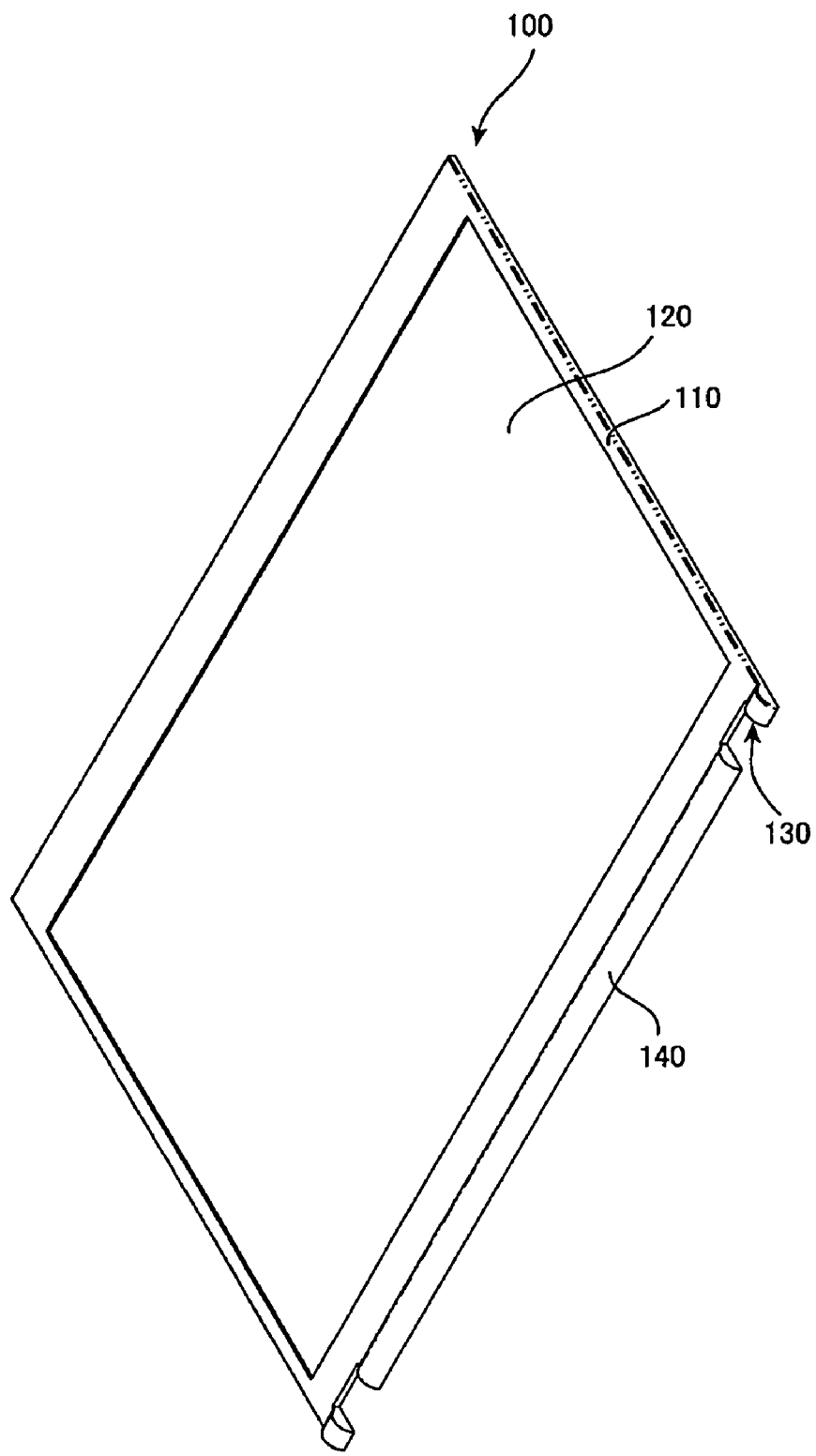
FIG. 3A is a view illustrating a front cover as viewed from the front.
Figure 3B:
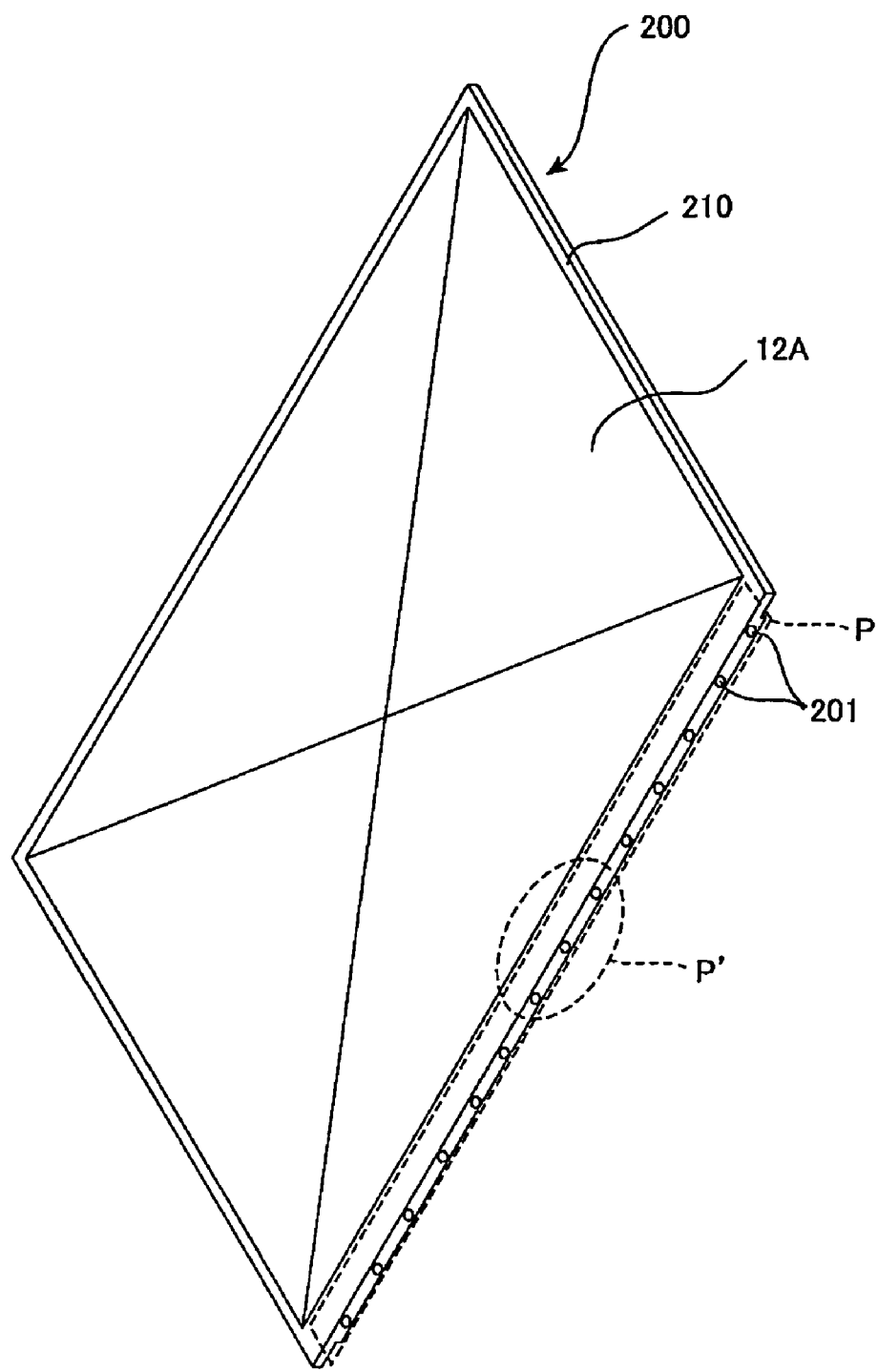
FIG. 3B is a view illustrating a display panel unit as viewed from the front.
Figure 3C:
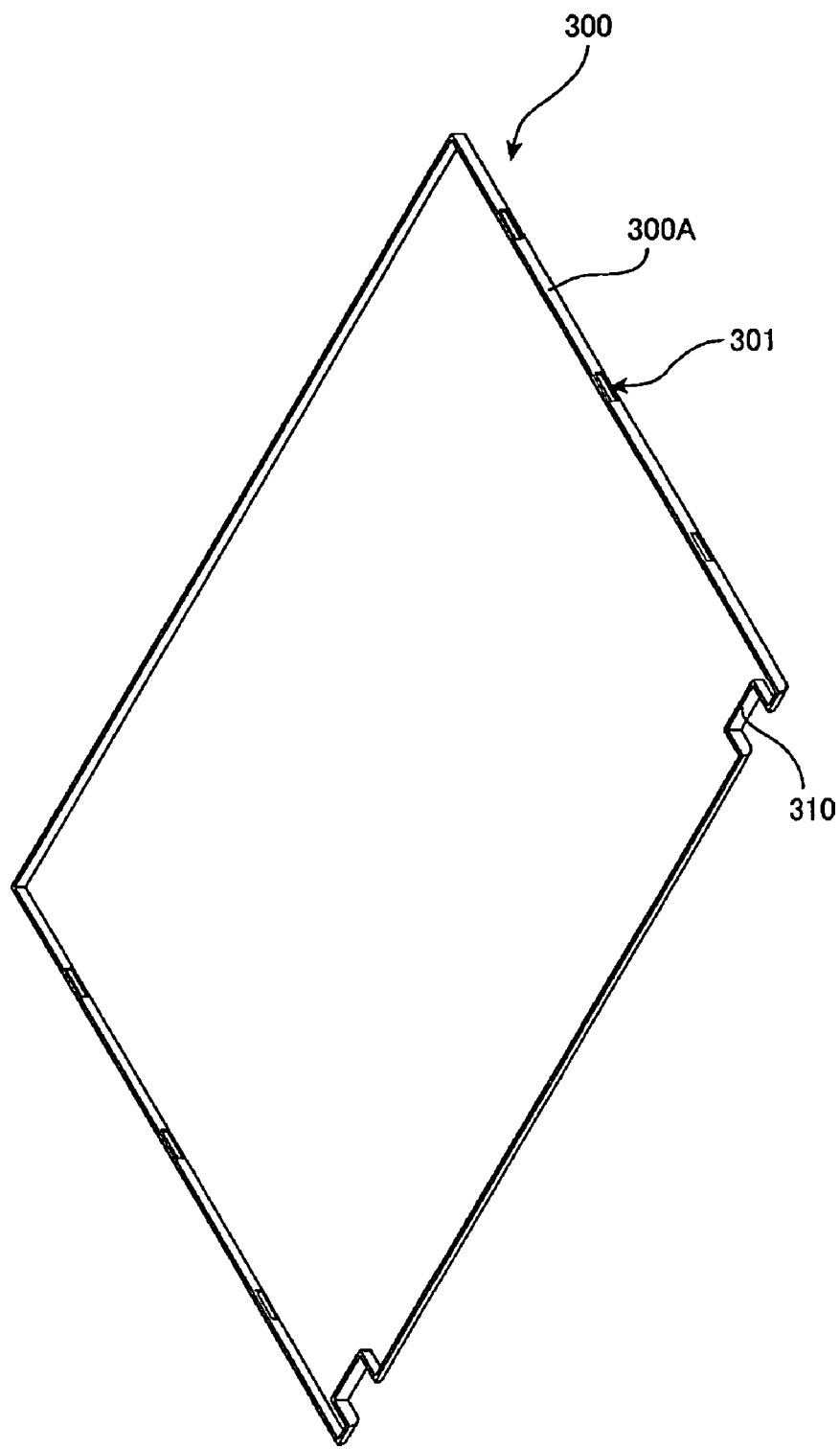
FIG. 3C is a view illustrating a rear cover as viewed from the front.
Figure 4A:
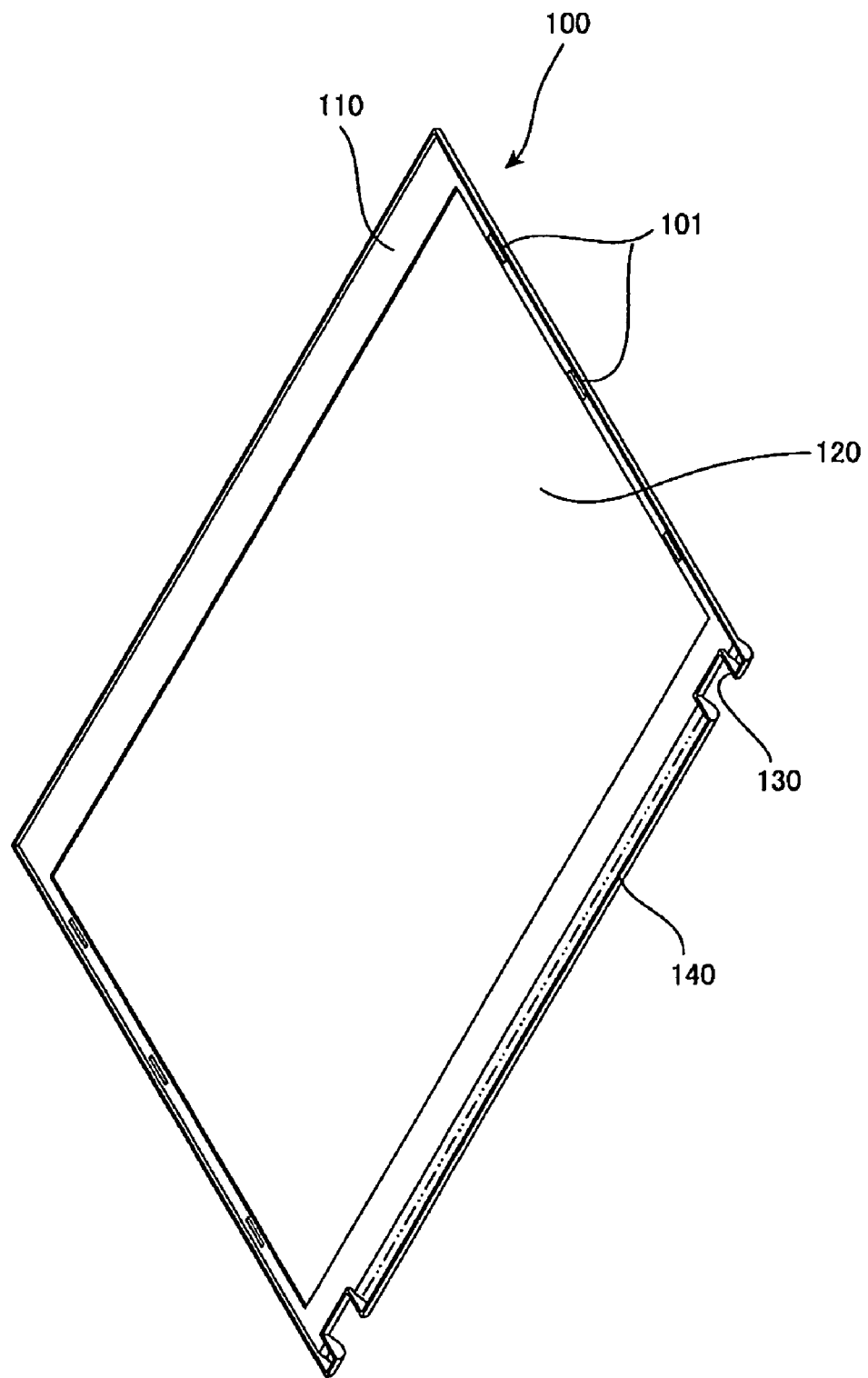
FIG. 4A is a view illustrating the front cover as viewed from the back.
Figure 4B:
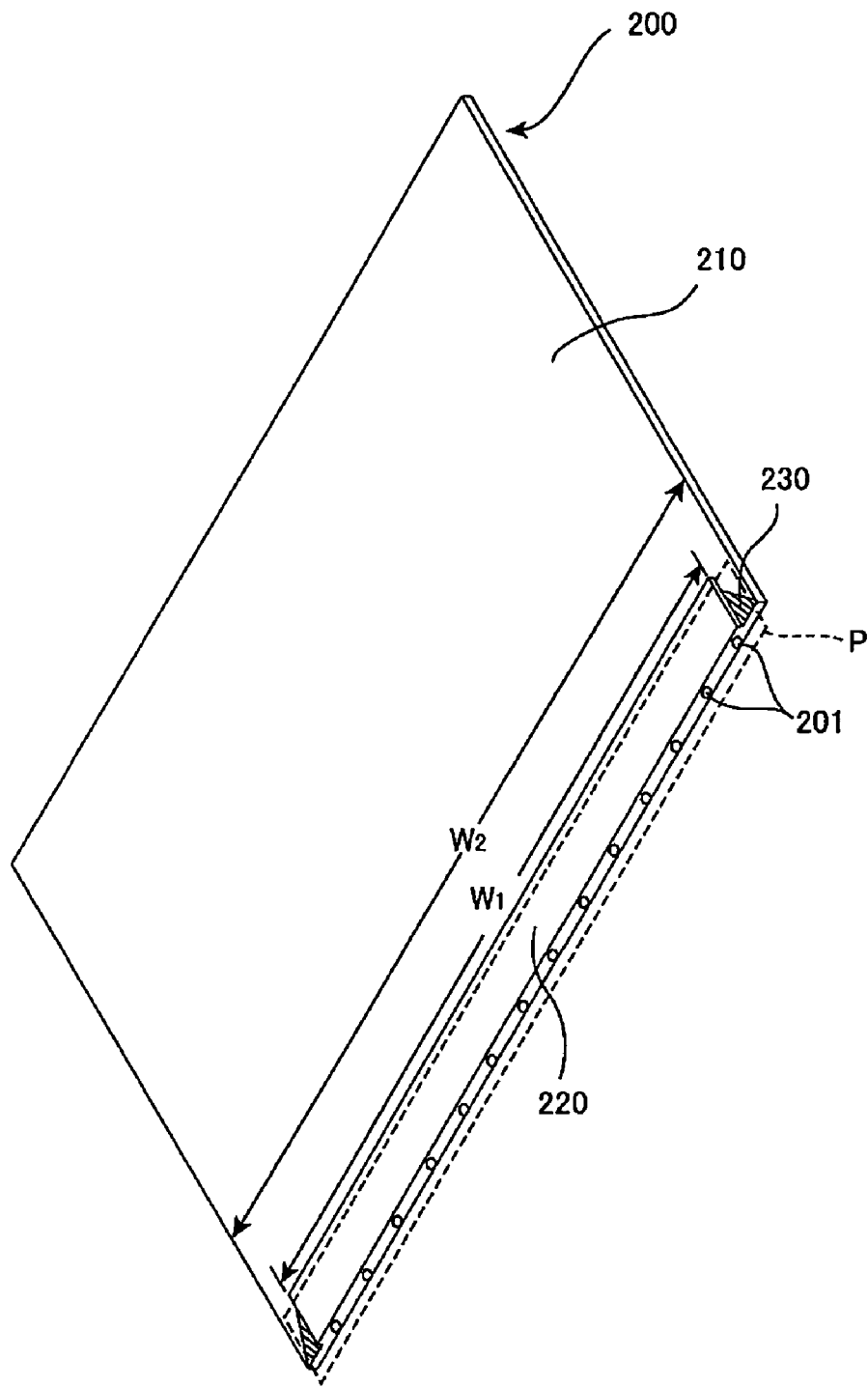
FIG. 4B is a view illustrating the display panel unit as viewed from the back.
Figure 4C:
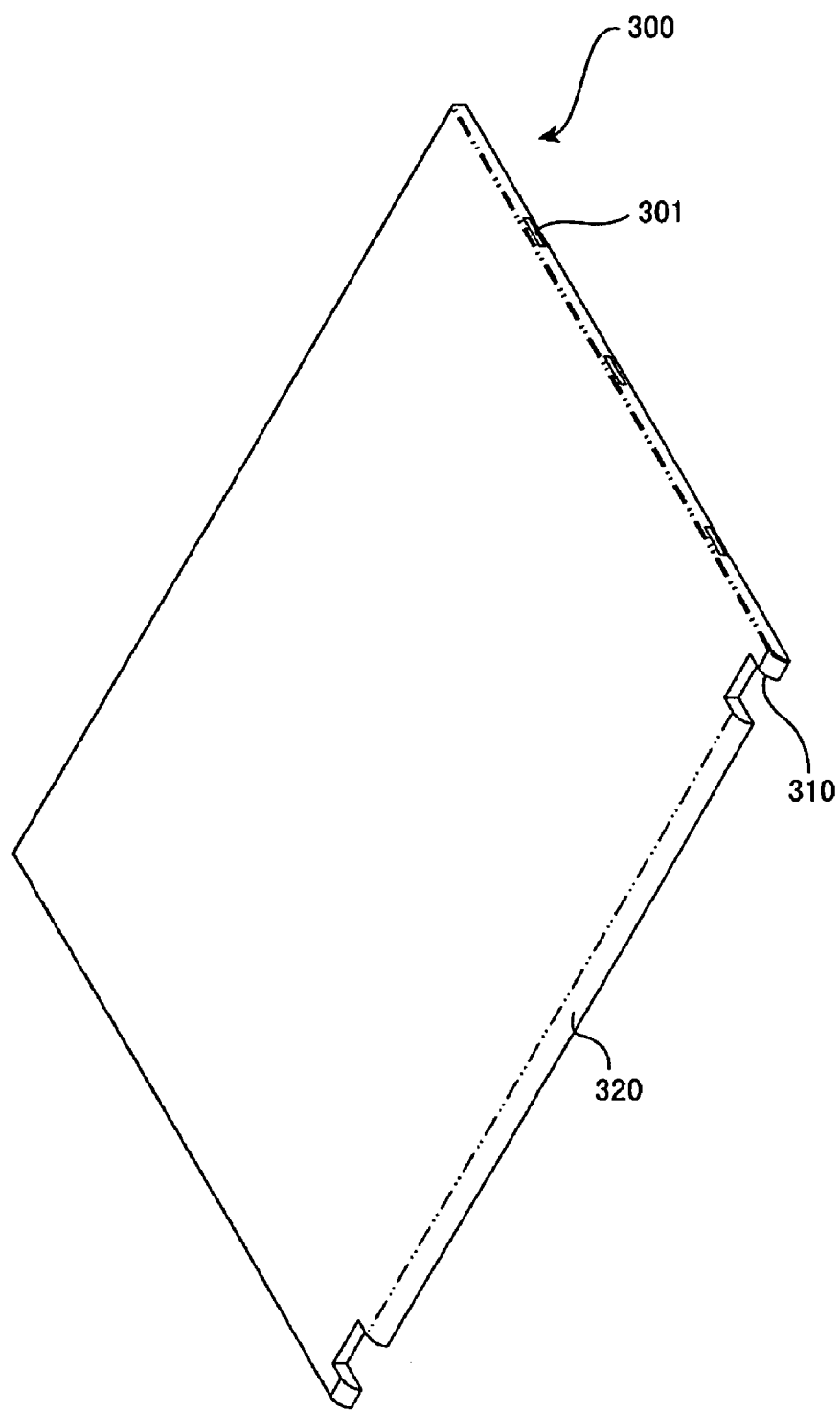
FIG. 4C is a view illustrating the rear cover as viewed from the back.

FIGS. 3A, 3B, 3C, 4A, 4B and 4C are views illustrating major components of the display device 12; FIGS. 3A and 4A illustrate a front cover 100; FIGS. 3B and 4B illustrate a display panel unit 200; FIGS. 3C and 4C illustrate a rear cover 300. FIGS. 3A, 3B and 3C illustrate each component as viewed from the "front"; FIGS. 4A, 4B and 4C illustrate each component as viewed from the "rear". Descriptions will be given below with reference to these component diagrams and FIG. 1.

In the display device 12, the display panel unit 200 is received in the housing 12B composed of two covers. The housing 12B includes: the front cover 100 covering the edge of the display screen 12A of the display panel unit 200; and the rear cover 300 covering the back of the display panel unit 200. The front cover 100 and the rear cover 300 are fit into each other at both sides of the display panel unit 200. The display panel unit 200 corresponds to an example of the display panel unit according to the present invention.

FIG. 3A illustrates the "front" side of the front cover 100.

The front cover 100 includes: an edge cover section 110 covering the edge of the display panel unit 200, a hinge joint section 130 to which the hinge 10A illustrated in FIG. 1 is attached, and a wiring cover section 140 which covers various connection lines and the like for connecting the main device 11 and the display device 12. An opening 120 is formed in that part of the edge cover section 110 which faces the display screen 12A of the display panel unit 200.

FIG. 3B illustrates the "front" side of the display panel unit 200.

The display panel unit 200 includes a panel body 210 that includes stacked components such as a liquid crystal layer having liquid crystal encapsulated between two plates, a light guide plate which guides light to the liquid crystal layer, and a reflection prevention sheet which suppresses light reflection, and also includes plural LED light sources 201 linearly arranged and fitted into the lower edge of the panel body 210. The display panel unit 200 also includes a control board 220 (refer to FIG. 4B) that controls the whole display panel unit 200. Light emitted by the LED light sources 201 is guided to the liquid crystal layer by the light guide plate provided on the panel body 210, and irradiated on the display screen 12A from the rear side. The LED light sources 201 tend to generate heat and further tend to be degraded by the heat. According to the present embodiment, the plural LED light sources 201 are linearly arranged; thus a linear area P into which the LED light sources 201 are fitted tends to have a high temperature and particularly in the central part P' of the area P, heat tends to accumulate.

FIG. 3C illustrates the "front" side of the rear cover 300.

The rear cover 300 includes a rear cover section 300A that covers the rear face of the display panel unit 200, and a hinge joint section 310 to which the hinge 10A is attached. And plural through holes 301 are formed in that part of the rear cover section 300A which covers the side of the display panel unit 200.

FIG. 4A illustrates the "rear" side of the front cover 100.

Plural protrusions 101 are provided in that part of the edge cover section 110 of the front cover 100 which covers the side of the display panel unit 200; when these protrusions 101 are fitted into the plural through holes 301 arranged in the rear cover section 300A, the rear cover 300 and the front cover 100 are joined in a separable manner.

FIG. 4B illustrates the "rear" side of the display panel unit 200.

In the rear face of the panel body 210, a radiator plate 230 for dissipating heat is attached onto area P which is heated by the LED light sources 201, and further the control board 220 which controls the whole display panel unit 200 is placed on the radiator plate 230. According to the present embodiment, the width W1 of the control board 220 is smaller than the width W2 of the panel body 210, and thus steps are formed at both sides of the control board 220.

FIG. 4C illustrates the "rear" side of the rear cover 300.

The rear cover 300 is also provided with a wiring cover section 320 which fits in the wiring cover section 140 of the front cover 100 and covers various connection lines from the back of the display panel unit 200.

In assembling the display device 12, firstly the display panel unit 200 is received in the front cover 100 so that the display screen 12A of the display panel unit 200 fits into the opening 120 of the front cover 100.

Subsequently, an antenna 400 (refer to FIG. 5) is arranged in an open space between the front cover 100 and the display panel unit 200, the open space being formed in the upper part of the front cover 100.

Figure 5:
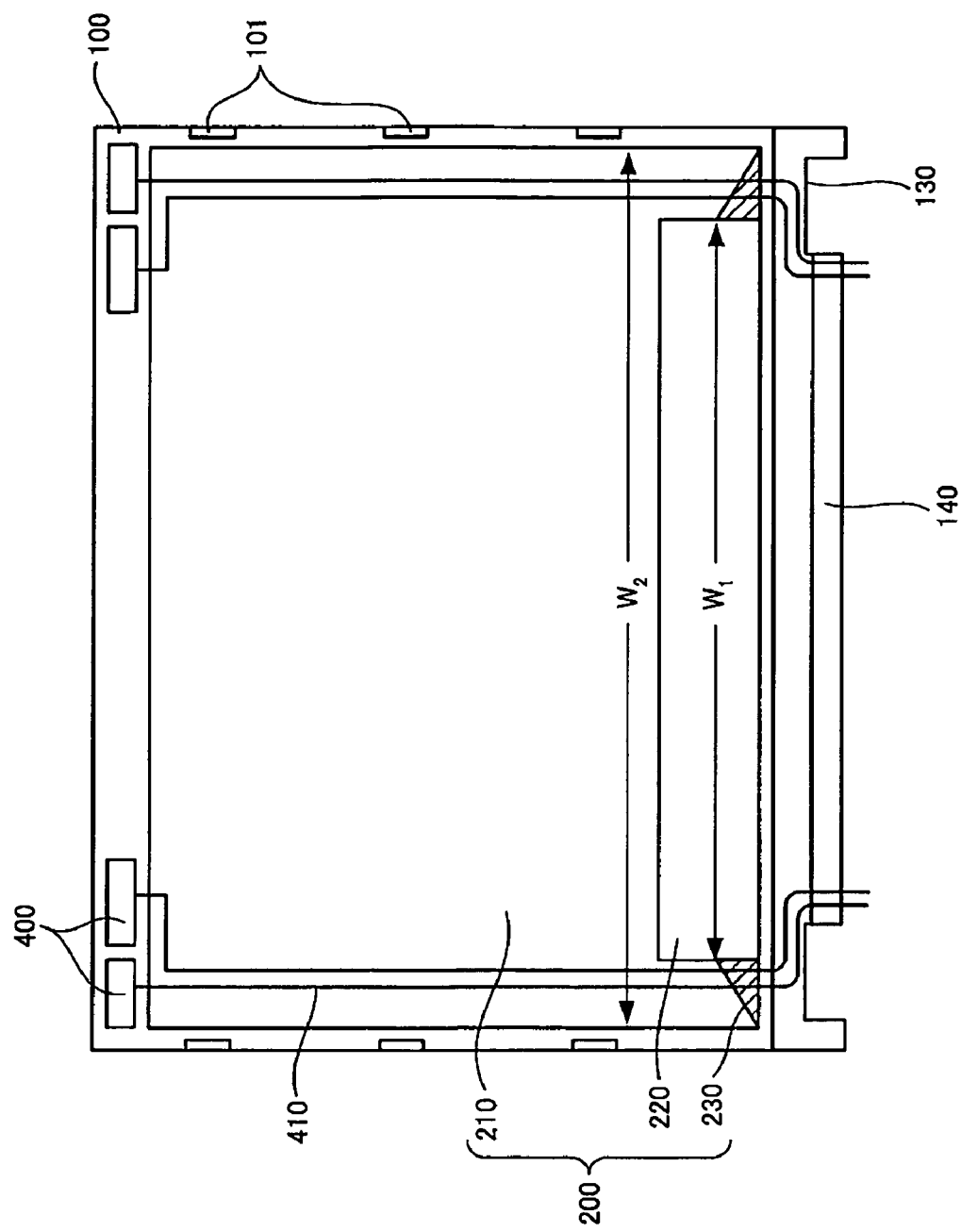
FIG. 5 is a view illustrating the internal configuration of the front cover in which the display panel unit and an antenna are arranged.

FIG. 5 is a view illustrating the internal configuration of the front cover 100 in which the display panel unit 200 and the antenna 400 are arranged.

As illustrated in FIG. 5, the display panel unit 200 is received in the front cover 100 while the front cover 100 has a remaining space in the upper part thereof; the antenna 400 is arranged in the space. According to the present embodiment, the width W1 of the control board 220 is smaller than the width W2 of the panel body 210, and thus steps are formed at both sides of the control board 220; a signal line 410 extending from the antenna 400 runs through the steps to the wiring cover section 140.

As illustrated in FIG. 3B, of the linear area P having fitted therein the LED light sources 201 of the panel body 210, particularly the central part P' tends to have a high temperature.

Figure 6:
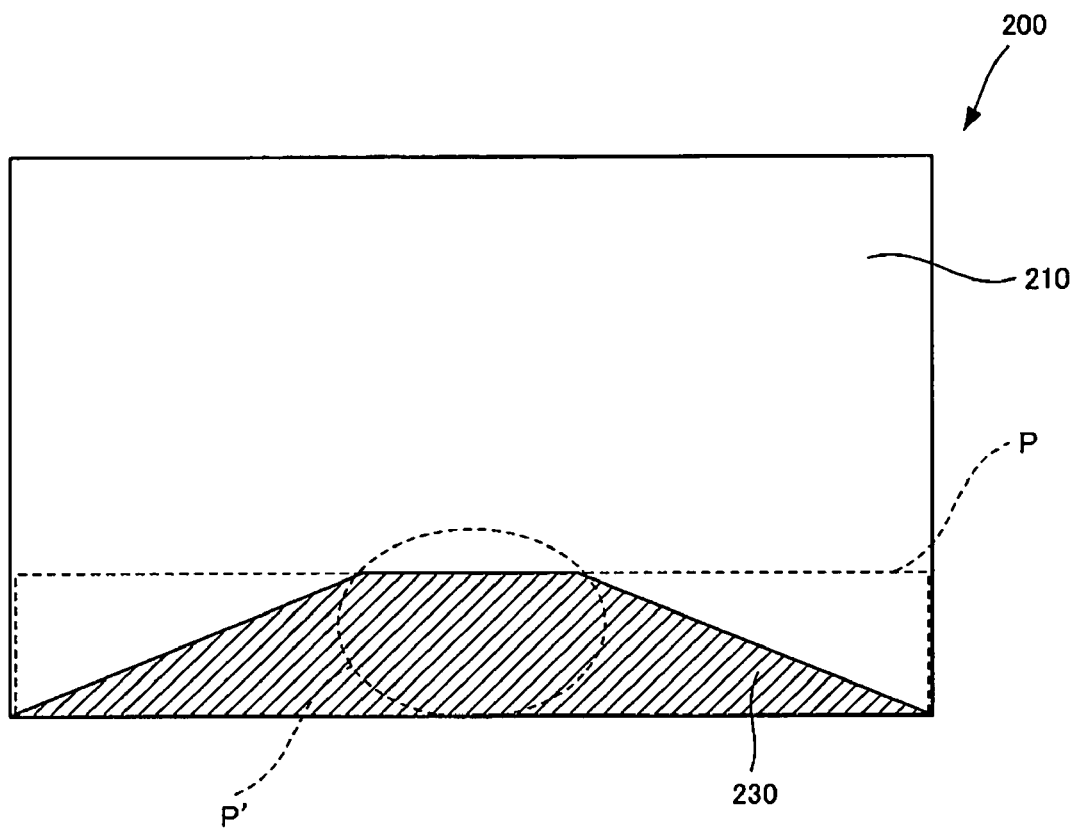
FIG. 6 is a view illustrating the display panel unit from which a control board has been removed.

FIG. 6 is a view illustrating the display panel unit 200 from which the control board 220 has been removed.

As illustrated in FIG. 6, the radiator plate 230 extends along the linear area P; the width of the linear area P becomes smaller from the central part P' to the end of the linear area P. Accordingly, heat is dissipated relatively efficiently in the central part P', suppressing non-uniformity of temperature in the linear area P and thus allowing improvement of life of all the plural LED light sources 201.

As described above, after the display panel unit 200 and antenna 400 are received in the front cover 100, the protrusions 101 of the front cover 100 are fitted into the through holes 301 of the rear cover 300, whereby the housing 12B is assembled.

Figure 7:
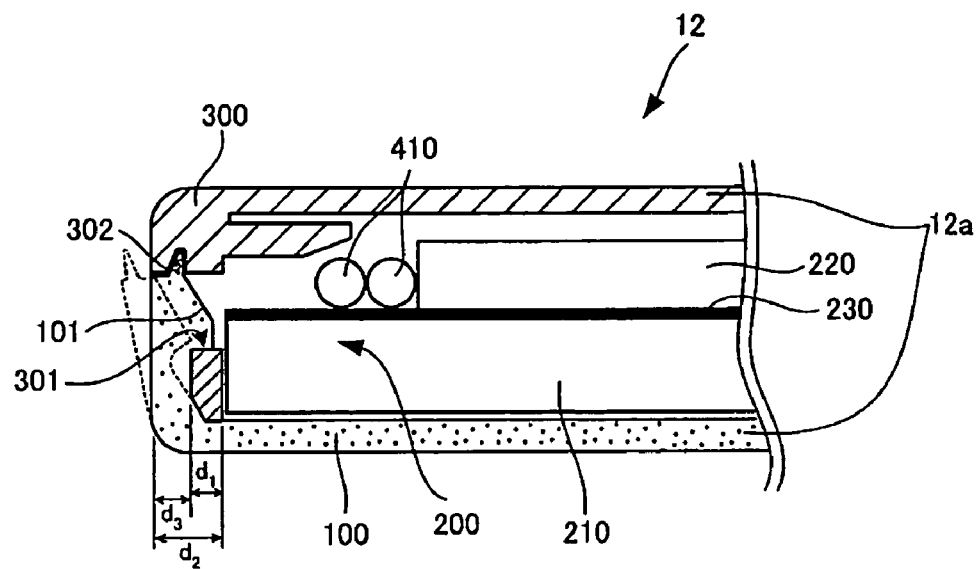
FIG. 7 is a cross-sectional view of a display device taken along a direction in which a radiator plate extends.
Figure 8:
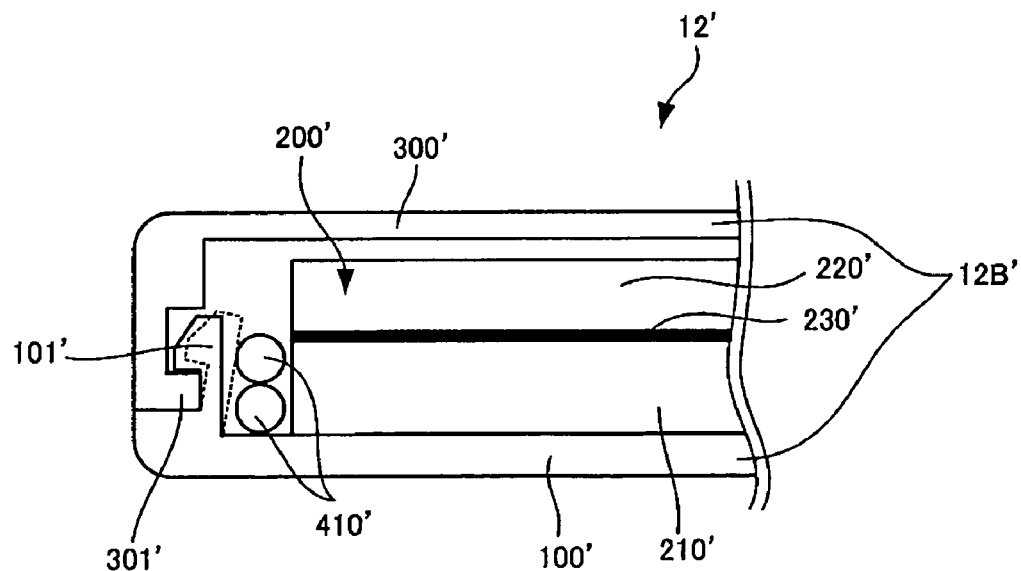
FIG. 8 is a cross-sectional view of a conventional display device taken along a direction in which a radiator plate extends.

FIG. 7 is a cross-sectional view of the display device 12 taken along a direction in which the radiator plate 230 extends; FIG. 8 is a cross-sectional view of a conventional display device taken along a direction in which the radiator plate extends.

In the display device 12 according to the present embodiment, as illustrated in FIG. 7, the rear cover 300 is formed so that the wall thickness d1 in the face side thereof is thinner than the wall thickness d2 in the rear side; the change in thickness of the rear cover 300 takes place across the through holes 301. Further, the front cover 100 is formed so that the wall thickness d3 in the face side thereof is approximately equal to a wall width difference (d2−d1) of the rear cover 300; the change in thickness of the front cover 100 takes place across the protrusions 101. Accordingly, when the front cover 100 and the rear cover 300 are joined, the external surface of the housing 12B becomes smooth. Also, the protrusions 101 of the front cover 100 are fitted into the through holes 301 of the rear cover 300 while pressed to the side surfaces of the rear cover 300 and bent toward the outside of the housing 12B; further, assist protrusions 302 are fitted into the rear cover 300. As a result, the front cover 100 and rear cover 300 are secured to each other.

In the conventional display device 12', as illustrated in FIG. 8, because clicks 101' and 301' provided in a front cover 100' and a rear cover 300', respectively engage with each other in the inside of the housing 12B', there must be a sufficient space between the housing 12B' and display panel unit 200' so that these clicks 101' and 301' can bend. In the display device 12 according to the present embodiment illustrated in FIG. 7, the protrusions 101 bend toward the outside, so that the space between the housing 12B and display panel unit 200 can be reduced, allowing downsizing of the display device 12.

Further, in the conventional display device 12', as illustrated in FIG. 8, the width of the control board 220' is appropriately identical to that of the panel body 210' and thus a space for receiving signal lines 410' extending from the antenna 400 (refer to FIG. 5) must be prepared between the display panel unit 200' and housing 12B'. In the display device 12 illustrated in FIG. 7, the signal lines 410 are laid through the space beside the control board 220, allowing reduction of the width of display device.

As described above, according to the display device 12 of the present embodiment, the space between the housing and display panel unit 200 can be reduced, so that the display device 12 can be downsized without reducing the size of the display screen 12A.

Further, non-uniformity of temperature in the area around the heat-vulnerable LED light sources can be suppressed to efficiently dissipate heat, allowing improvement in life of the display device 12.

Now, the description of the first embodiment of the present invention is finished, and a second embodiment of the present invention will be described. The difference between the first embodiment and second embodiment lies in the structure of display panel unit and rear cover; apart from this difference, the second embodiment has substantially the same structure as the first embodiment. Accordingly, the same reference alphanumeric characters are applied to parts corresponding to the first embodiment, and hence an explanation thereof is omitted; only the points different from the first embodiment will be described.

Figure 9:
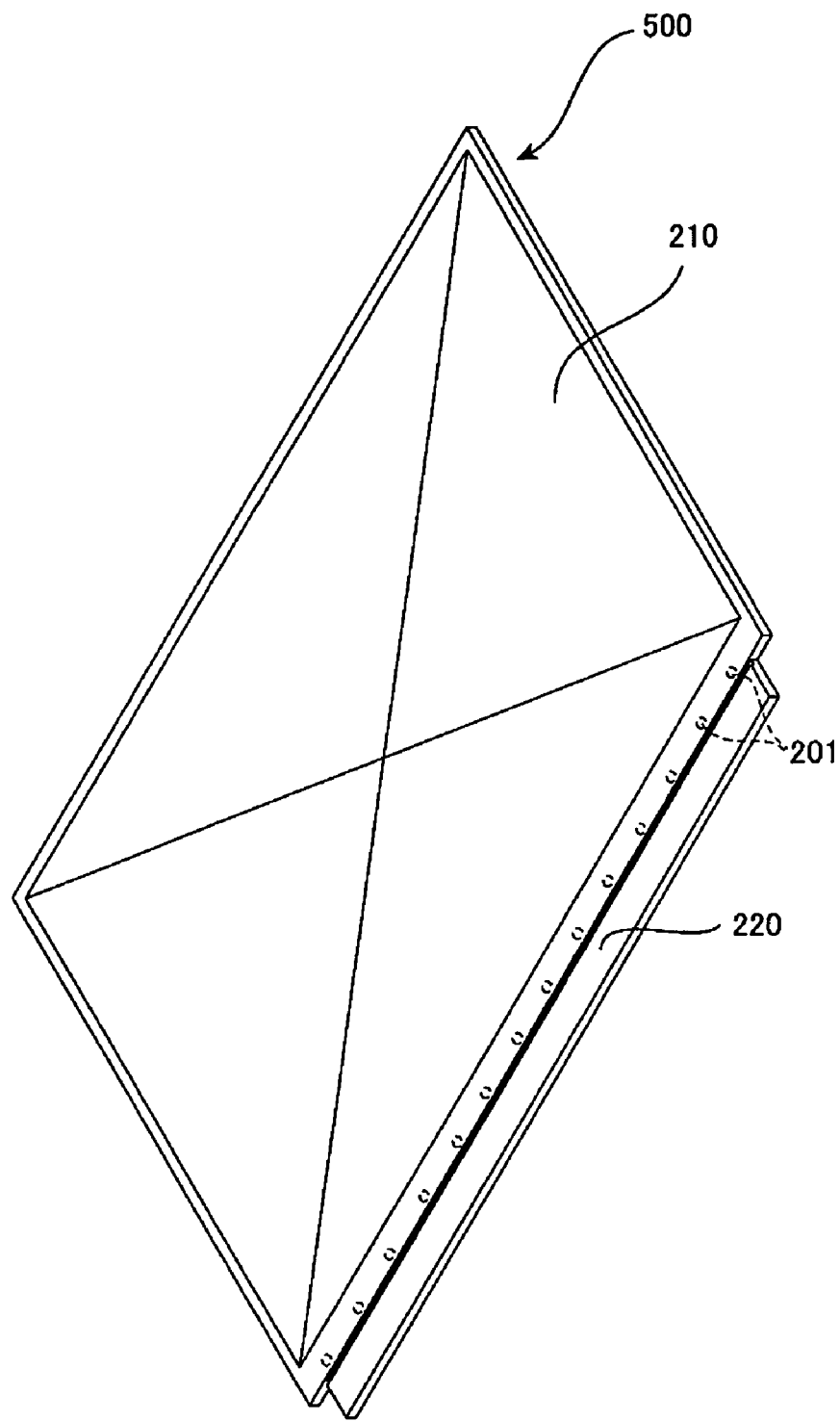
FIG. 9 is a view illustrating a display panel unit as viewed from the front according to a second embodiment of the present invention.

FIG. 9 is a view illustrating the front of a display panel unit 500 of the present embodiment.

The display panel unit 500 of the present embodiment illustrated in FIG. 9 includes, similarly to the display panel unit 200 of the first embodiment illustrated in FIG. 3B, a panel body 210 and control board 220; plural LED light sources 201 are fitted in the panel body 210. In the display panel unit 500, however, the control board 220 is not laid on the panel body 210, but disposed inside the housing while extending from the panel body 210.

Figure 10:
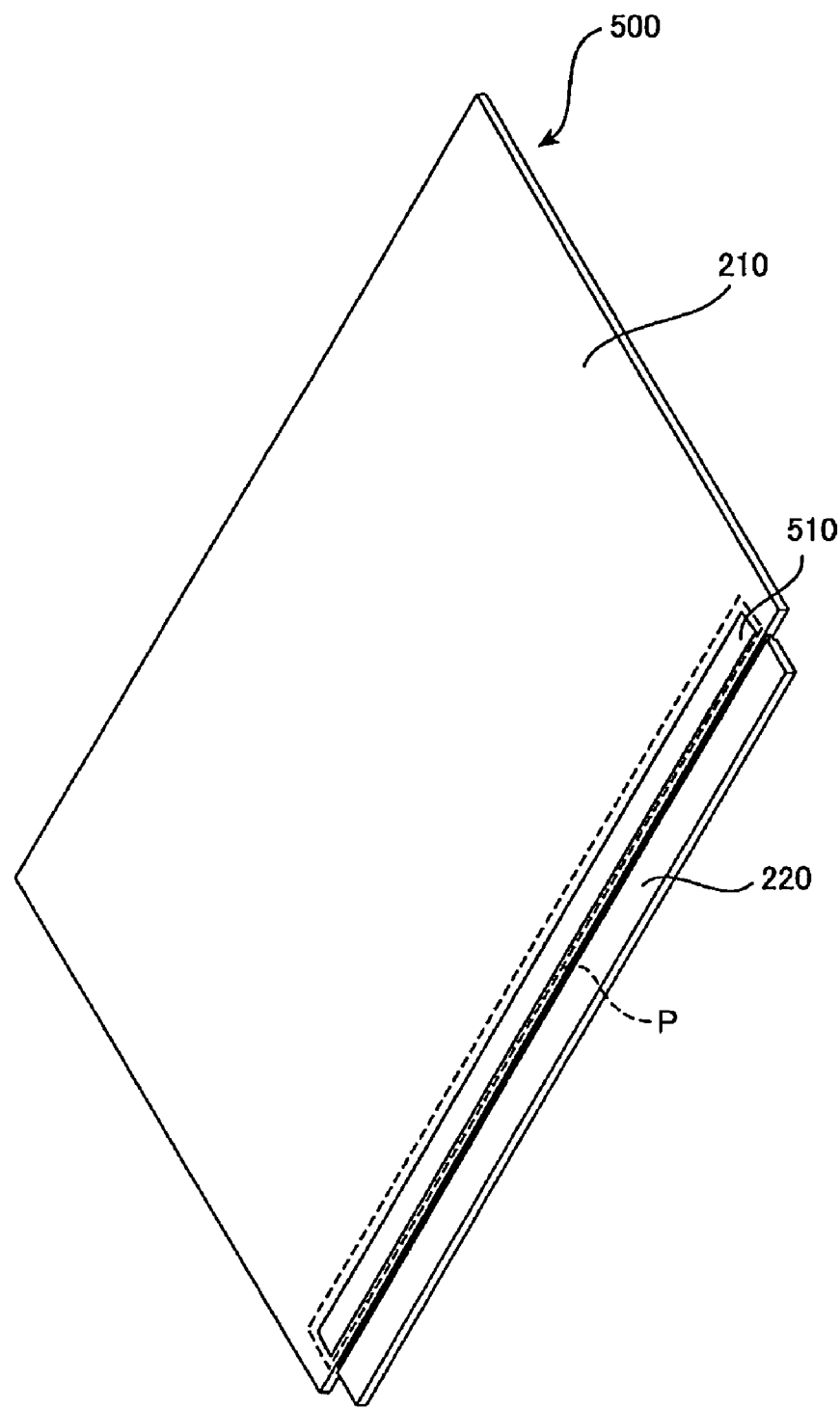
FIG. 10 is a view illustrating the display panel unit as viewed from the back according to the second embodiment of the present invention.

FIG. 10 is a view illustrating the back of the display panel unit 500 according to the present embodiment.

In the display panel unit 500 of the present embodiment, a heat transmission plate 510 of rubber for transmitting heat to a rear cover 600 (refer to FIG. 11) is attached to the linear area P in which heat generated by the LED light sources 201 is accumulated.

Figure 11:
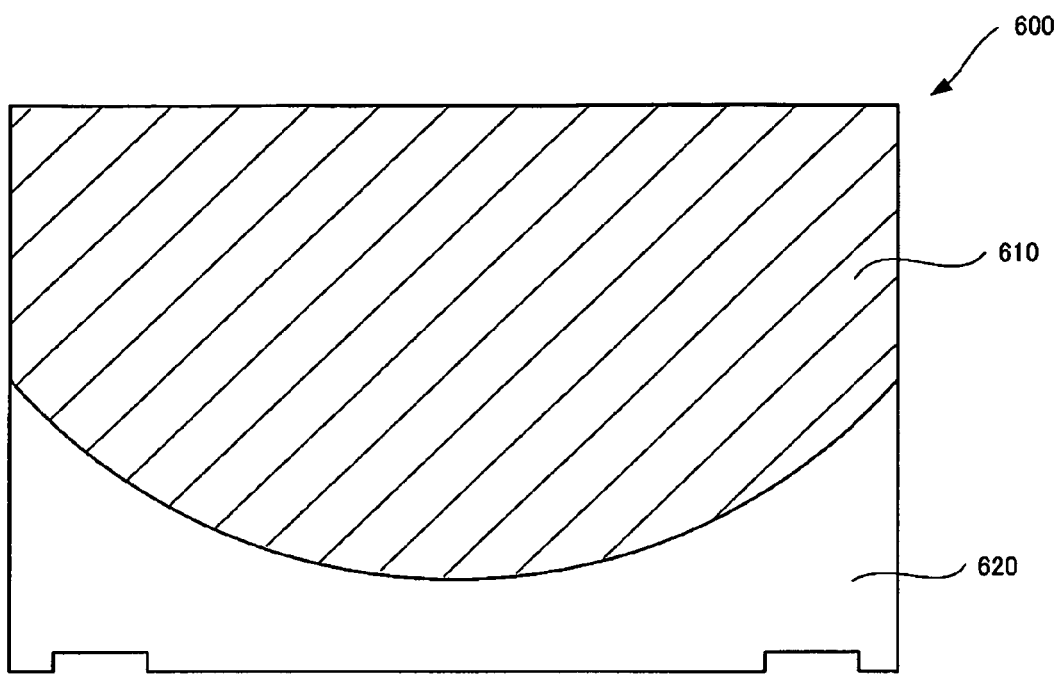
FIG. 11 is a view illustrating a rear cover which covers the rear face of the display panel unit.

FIG. 11 is a view illustrating the rear cover 600 that covers the back of the display panel unit 500.

The rear cover 600 of the present embodiment has the same shape as the rear cover 300 of the first embodiment illustrated in FIG. 3C, but is composed of two kinds of materials having thermal conductivity different from each other. According to the present embodiment, a metal area 610 of a metal having a high thermal conductivity and a plastic area 620 of a plastic having a relatively low thermal conductivity are formed in a hybrid manner, and the borderline between them protrudes downward in the rear cover 600.

Figure 12:
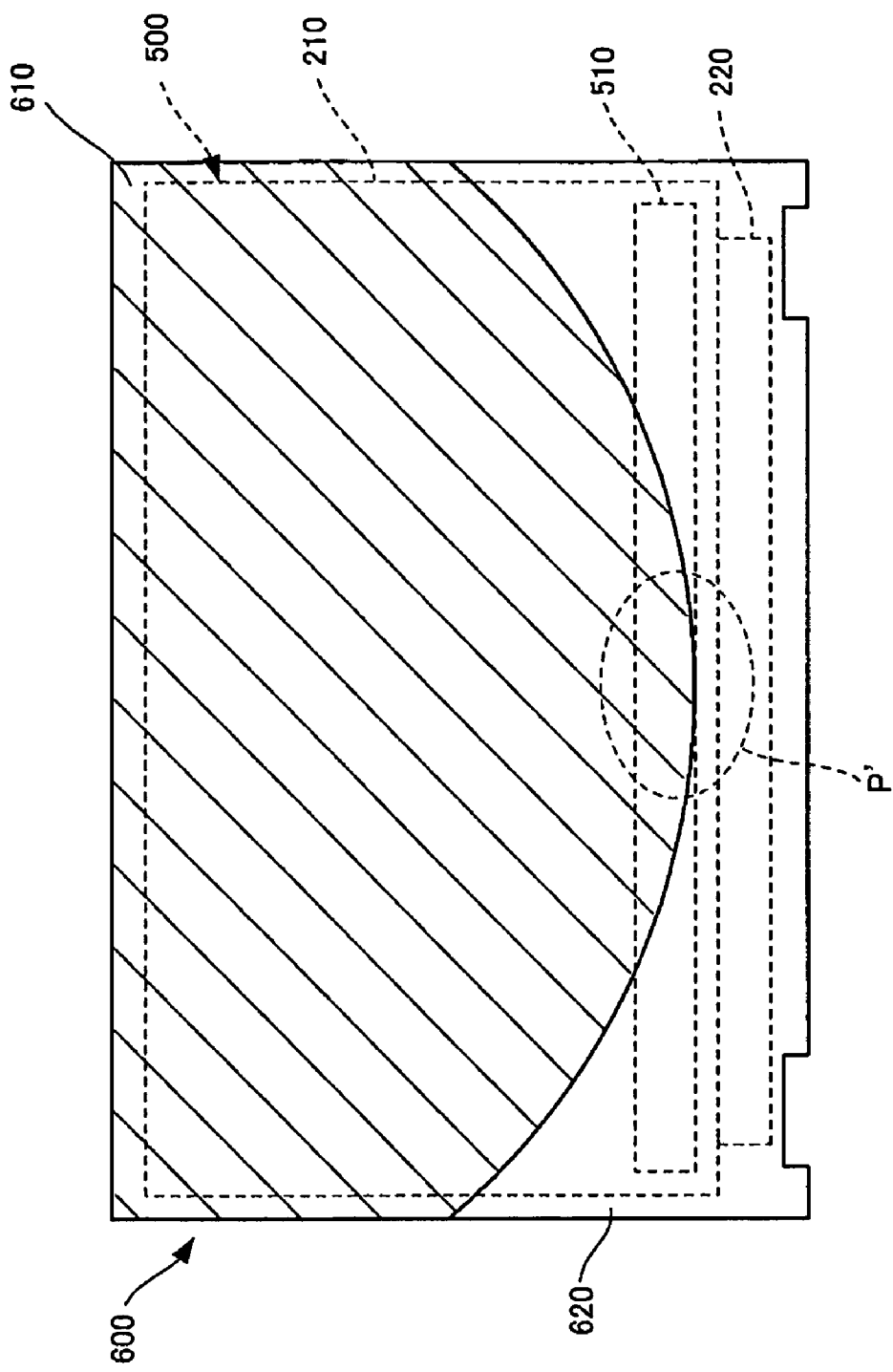
FIG. 12 is a view illustrating the positional relationship between the display panel unit and rear cover when the display panel unit is received in the rear cover.

FIG. 12 is a view illustrating the positional relationship between the display panel unit 500 and rear cover 600 when the display panel unit 500 is received in the rear cover 600.

As illustrated in FIG. 12, the heat transmission plate 510 arranged in the linear area P heated by the LED light sources 201 contacts the boundary and its vicinities between the metal area 610 and plastic area 620 of the rear cover 600; the central part P' of the linear area P (see FIG. 10) has a large contact area with the metal area 610, and the both ends of the linear area P have a large contact area with the plastic area 620. The heat generated by the linear area P is transmitted via the heat transmission plate 510 to the rear cover 600 and dissipated through the rear cover 600. In this case, since the central part P' in which heat tends to accumulate contacts the metal area 610, the heat is efficiently transmitted and dissipated; since the ends of the linear area P in which heat hardly accumulates contact the plastic area 620 having a low thermal conductivity, the heat is transmitted and dissipated with a low efficiency. Consequently, non-uniformity of temperature in the linear area P is reduced, allowing improvement of device life.

Now, the description of the second embodiment of the present invention is finished, and a third embodiment of the present invention will be described. The difference between the second embodiment and third embodiment lies in the configuration of the heat transmission plate mounted in the display panel unit and the structure of the rear cover; apart from this difference, the third embodiment has substantially the same structure as the second embodiment. Accordingly, the same reference alphanumeric characters are applied to parts corresponding to the second embodiment, and hence an explanation thereof is omitted; only the points different from the second embodiment will be described.

In the display device according to the present embodiment, there is used a rear cover which has the same configuration as the rear cover 600 of the second embodiment illustrated in FIG. 12 but has its whole surface composed of metal except for its part which covers the edge of the display panel unit.

Figure 13:
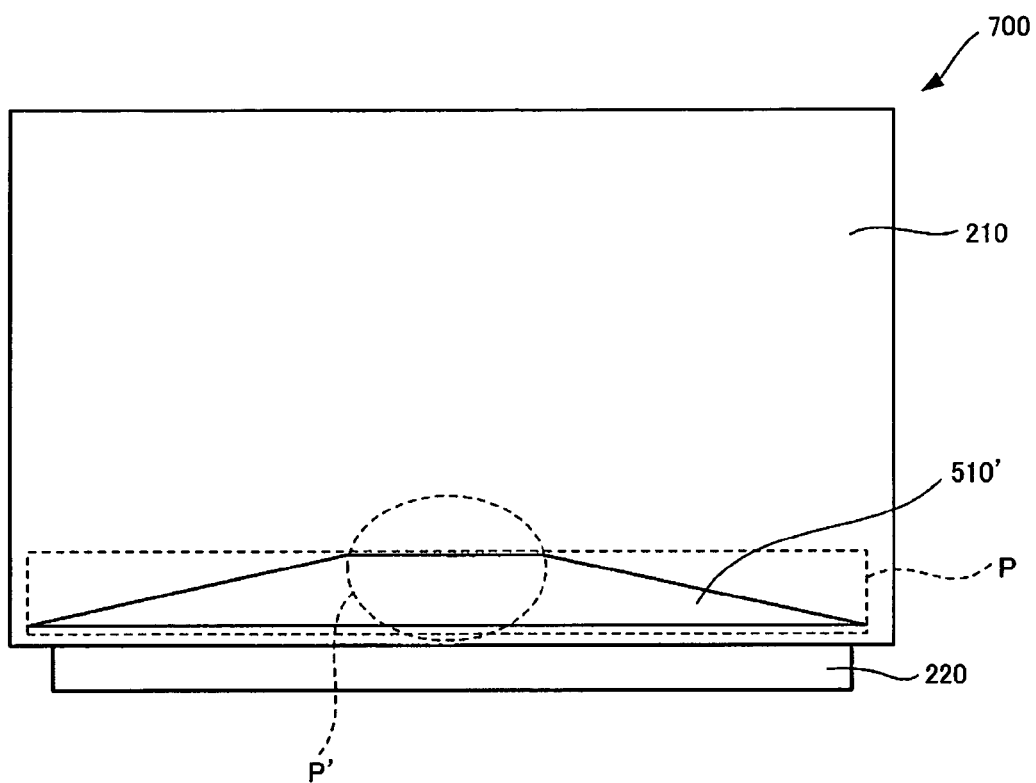
FIG. 13 is a view illustrating the rear face of a display panel unit according to a third embodiment of the present invention.

FIG. 13 is a view illustrating the back of a display panel unit 700 of the present embodiment.

The display panel unit 700 of the present embodiment includes, similarly to the display panel unit 500 of the second embodiment illustrated in FIG. 10, a panel body 210, a control board 220 and a heat transmission plate 510'. However, the configuration of the heat transmission plate 510' is different from that of the heat transmission plate 510 of the second embodiment. In the heat transmission plate 510' of the present embodiment, the width of the linear area P heated by the LED light sources becomes smaller from the central part P' to the ends of the linear area P; and the whole heat transmission plate 510' contacts the metal surface of the rear cover 600.

In the central part P', a larger amount of heat generated in the linear area P is transmitted through the heat transmission plate 510 to the rear cover 600 and dissipated through the rear cover 600. In this way, when the central part of the linear area P in which heat tends to accumulate has a larger width, also, non-uniformity of temperature in the linear area P can be suppressed.

The above description is of an example in which the present invention is applied to a personal computer. However, the present invention may be applied to, for example, a liquid crystal television set or a mobile telephone terminal.

Also, the above description is of an example in which non-uniformity of temperature in the linear area is suppressed by forming the heat transmission plate so that the central part of the linear area has a larger width. However, non-uniformity of temperature in the linear area may also be suppressed by using a heat transmission plate having a uniform width over the entire linear area, the both ends of the heat transmission plate being coated with resin which prevents heat transmission.

What is claimed is:

1. A display device comprising:
   a display panel unit that includes a display screen for displaying information and a light emitting section having a light source for emitting light to illuminate the display screen from back, and that linearly generates heat during light emission;
   a radiator that receives the heat generated by the light emitting section and dissipates the received heat; and
   a heat transmission section that transmits the heat generated by the light emitting section to the radiator such that heat generated in the middle of a linear heat generation part of the light emitting section is transmitted faster than heat generated at the end of the linear heat generation part.

2. The display device according to claim 1, wherein the radiator is a housing of the display device.

3. The display device according to claim 1, wherein the light source is a light-emitting diode.

4. The display device according to claim 1, wherein the radiator has a first area made of a first material, and a second area made of a second material that transmits heat faster than the first material, and a borderline between the first and second areas forms a protrusion in the first area side, and
   wherein the heat transmission section is a member which extends along the linear heat generation part of the light emitting section while contacting the light emitting section, the member has a part corresponding to the protrusion of the radiator, the part includes a central portion and an end portion, and the central portion has a larger contact area contacting the second area of the radiator than the end portion.

5. The display device according to claim 1, wherein the heat transmission section becomes gradually narrower as the heat transmission section extends along the linear heat generation part of the light emitting section toward the end of the heat transmission section while contacting both the light emitting section and the radiator.

6. A display panel unit comprising:
   a panel body that includes a display screen for displaying information and a light emitting section having a light source for emitting light to illuminate the display screen from back, and that linearly generates heat during light emission; and
   a radiator plate which receives the heat generated by the light emitting section and dissipates the received heat, and extends along a linear heat generation part of the light emitting section, in which the middle of the radiator plate has a wider heat dissipation area than the end of the radiator plate.

7. The display panel unit according to claim 6, wherein the radiator plate becomes gradually narrower from the middle to the end thereof.

8. The display panel unit according to claim 6, wherein the light source is a light-emitting diode.

9. An information processing apparatus comprising:
a display section including:
a display panel unit that includes a display screen for displaying information and a light emitting section having a light source for emitting light to illuminate the display screen from back, and that linearly generates heat during light emission,
a radiator that receives the heat generated by the light emitting section and dissipates the received heat, and
a heat transmission section that transmits the heat generated by the light emitting section to the radiator such that heat generated in the middle of the linear heat generation part of the light emitting section is transmitted faster than heat generated at the end of the linear heat generation part; and
a processing section that processes information and causes the display section to display the processed information on the display screen of the display panel unit included in the display section.

10. The information processing apparatus according to claim 9, wherein the radiator is a housing of the information processing apparatus.

11. The information processing apparatus according to claim 9, wherein the light source is a light-emitting diode.

12. The information processing apparatus according to claim 9, wherein the radiator has a first area made of a first material, and a second area made of a second material that transmits heat faster than the first material, and a borderline between the first and second areas forms a protrusion in the first area side, and
wherein the heat transmission section is a member which extends along the linear heat generation part of the light emitting section while contacting the light emitting section, the member has a part corresponding to the protrusion of the radiator, the part includes a central portion and an end portion, and the central portion has a larger contact area contacting the second area of the radiator than the end portion.

13. The information processing apparatus according to claim 9, wherein the heat transmission section becomes gradually narrower as the heat transmission section extends along the linear heat generation part of the light emitting section toward the end of the heat transmission section, while contacting both the light emitting section and the radiator.

14. An information processing apparatus comprising:
a display section having a display panel unit including:
a panel body that includes a display screen for displaying information and a light emitting section having a light source for emitting light to illuminate the display screen from back, and that linearly generates heat during light emission, and
a radiator plate which receives the heat generated by the light emitting section and dissipates the received heat, and which extends along a linear heat generation part of the light emitting section, in which the middle of the radiator plate has a wider heat dissipation area than the end of the radiator plate; and
a processing section that processes information and causes the display section to display the processed information on the display screen of the display panel unit included in the display section.

15. The information processing apparatus according to claim 14, wherein the radiator plate becomes gradually narrower from the middle to the end thereof.

16. The information processing apparatus according to claim 14, wherein the light source is a light-emitting diode.

* * * * *

UNITED STATES PATENT AND TRADEMARK OFFICE
CERTIFICATE OF CORRECTION

PATENT NO. : 8,072,555 B2
APPLICATION NO. : 12/000920
DATED : December 6, 2011
INVENTOR(S) : Masaya Takayanagi et al.

It is certified that error appears in the above-identified patent and that said Letters Patent is hereby corrected as shown below:

Title Page:
Item 56 Column 1, References Cited, Under U.S. PATENT DOCUMENTS, delete "2006/0274394 A1 12/2006 Falk" and insert -- 2006/0243948 A1    11/2006 Ishiwa --, therefor.

Signed and Sealed this
Twenty-eighth Day of February, 2012

David J. Kappos
*Director of the United States Patent and Trademark Office*